United States Patent
Pfaffeneder et al.

(10) Patent No.: US 9,020,684 B2
(45) Date of Patent: Apr. 28, 2015

(54) METHOD, SYSTEM AND COMPUTER PROGRAMME PRODUCT FOR MONITORING THE FUNCTION OF A SAFETY MONITORING SYSTEM OF A CONTROL UNIT

(75) Inventors: Bernd Pfaffeneder, Regensburg (DE); Alexander Kalbeck, Burglengenfeld (DE); Stefan Goss, Brunn (DE)

(73) Assignee: Continental Automotive GmbH (DE)

( * ) Notice: Subject to any disclaimer, the term of this patent is extended or adjusted under 35 U.S.C. 154(b) by 113 days.

(21) Appl. No.: 13/981,109

(22) PCT Filed: Jan. 24, 2012

(86) PCT No.: PCT/EP2012/051009
§ 371 (c)(1),
(2), (4) Date: Sep. 11, 2013

(87) PCT Pub. No.: WO2012/104167
PCT Pub. Date: Aug. 9, 2012

(65) Prior Publication Data
US 2014/0012463 A1    Jan. 9, 2014

(30) Foreign Application Priority Data

Jan. 31, 2011 (DE) .......................... 10 2011 003 358
Dec. 22, 2011 (DE) .......................... 10 2011 089 590

(51) Int. Cl.
*G05B 19/048* (2006.01)
*B60T 17/22* (2006.01)
*G06F 17/00* (2006.01)

(52) U.S. Cl.
CPC ............... *G06F 17/00* (2013.01); *B60T 17/221* (2013.01)

(58) Field of Classification Search
CPC ........ G06F 17/00; G05B 19/048; F02D 41/26
USPC ........................ 701/29.1, 29.7, 32.7; 340/438
See application file for complete search history.

(56) References Cited

U.S. PATENT DOCUMENTS 4,241,403 A * 12/1980 Schultz .................... 701/32.5
5,041,976 A *  8/1991 Marko et al. ............. 701/32.9

(Continued)

FOREIGN PATENT DOCUMENTS

| DE | 10 2009 046 606 | 4/2011 |
| WO | WO 2007/090764 | 8/2007 |
| WO | WO 2008/003547 | 1/2008 |

OTHER PUBLICATIONS

International Search Report corresponding to PCT/EP2012/051009, dated Jun. 25, 2012.

*Primary Examiner* — Tan Q Nguyen
(74) *Attorney, Agent, or Firm* — RatnerPrestia

(57) ABSTRACT

A computer-implemented method for monitoring the function of a safety monitoring system of a control unit of an actuator system of a motor vehicle, wherein it is checked by the function monitoring whether the safety monitoring is performed faultlessly, wherein the safety monitoring is carried out by a first monitoring entity and the function monitoring is carried out by a second monitoring entity, wherein the first monitoring entity sends a result of the safety monitoring as an information item to the second monitoring entity at defined time intervals, wherein the first monitoring entity and the second monitoring entity are free of a common interface, wherein the information item is received by the second monitoring entity by utilizing an interface between the second monitoring entity and the control unit, and wherein the information item is coded in a format which cannot be interpreted by the control unit.

10 Claims, 1 Drawing Sheet

(56) References Cited

U.S. PATENT DOCUMENTS

| | | |
|---|---|---|
| 2004/0046448 A1 | 3/2004 | Brown |
| 2010/0045096 A1 | 2/2010 | Schonlau et al. |
| 2011/0264324 A1* | 10/2011 | Petite et al. .................... 701/33 |
| 2012/0253574 A1 | 10/2012 | Krueger et al. |

\* cited by examiner

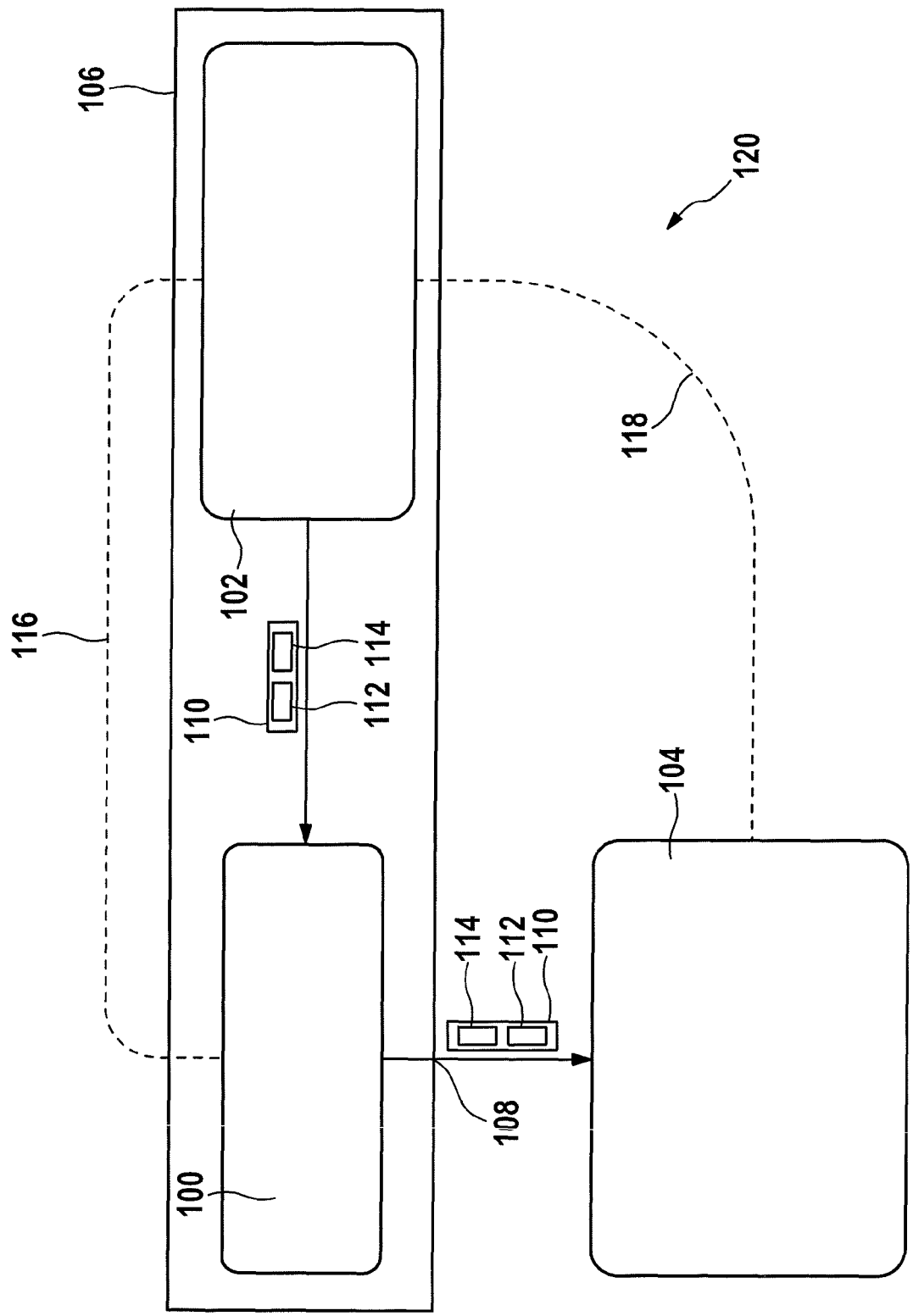

METHOD, SYSTEM AND COMPUTER PROGRAMME PRODUCT FOR MONITORING THE FUNCTION OF A SAFETY MONITORING SYSTEM OF A CONTROL UNIT

CROSS REFERENCE TO RELATED APPLICATIONS

This application is the U.S. National Phase Application of PCT/EP2012/051009, filed Jan. 24, 2012, which claims priority to German Patent Application No. 10 2011 003 358.0, filed Jan. 31, 2011 and German Patent Application No. 10 2011 089 590.6, filed Dec. 22, 2011, the contents of such applications being incorporated by reference herein.

FIELD OF THE INVENTION

The invention relates to a method for monitoring the function of a safety monitoring system of a control unit of an actuator system of a motor vehicle, to a system having a control unit for an actuator system of a motor vehicle and a first monitoring entity, to a device having a control unit in an actuator system of a motor vehicle, to a system for monitoring the function of a safety monitoring system of a control unit of an actuator system of a motor vehicle, and to a computer program product.

BACKGROUND OF THE INVENTION

In safety-related systems in the area of a motor vehicle, a main computer is checked continuously with respect to maintaining safety requirement levels, e.g. of Class ASIL C, by a second computer. In this context, ASIL means Automotive Safety Integrity Level and Class C implies the maintenance of safety measures according to the ISO WD 26262 Standard for maintaining the controllability of safety-related systems of the motor vehicle.

In the embodiments, known in the prior art, for monitoring the safety of the main computer, all the communication can be blocked by the second computer so that a further external monitoring entity derives from this situation a faulty behavior of the main computer. In previous embodiments for monitoring the safety of the main computer, even the main computer itself can take the second computer, performing the safety monitoring, out of operation, for example via a reset line, by fault programming or by other errors. The prior art is reproduced in printed documents DE 10 2009 046 006 A1, WO 2007/090764 A1 and WO 2008/003547 A1, which are incorporated by reference.

SUMMARY OF THE INVENTION

By comparison, an aspect of the invention is based on creating an improved method for monitoring the function of a safety monitoring system of a control unit of an actuator system of a motor vehicle, an improved system comprising a control unit for an actuator system of a motor vehicle and a first monitoring entity, an improved device comprising a control unit in an actuator system of a motor vehicle, an improved system for monitoring the function of a safety monitoring system of a control unit of an actuator system of a motor vehicle, and a computer program product.

A method for monitoring the function of a safety monitoring system of a control unit of an actuator system of a motor vehicle is created, wherein it is checked by means of the function monitoring whether the safety monitoring is performed faultlessly, wherein the safety monitoring takes place by means of a first monitoring entity and function monitoring takes place by means of a second monitoring entity, wherein the first monitoring entity sends a result of the safety monitoring to the second monitoring entity as an information item at defined time intervals, wherein the first monitoring entity and the second monitoring entity are free of a common interface, wherein the information item is received by the second monitoring entity by utilizing an interface between the second monitoring entity and the control unit, wherein the information item is coded in a format which cannot be interpreted by the control unit.

This may have the advantage that a separate external interface for the first monitoring entity to a further external monitoring entity is not necessary. The design of the first monitoring entity can be kept very simple, small and cost-effective, therefore. Furthermore, an existing communication of the control unit remains in existence advantageously during an activation of a safety function by the first monitoring entity and is not blocked by activities of the first monitoring entity. For example, an existing communication of the control unit would not be interrupted or otherwise disturbed during the performance of a diagnostic function or of a software update of the first monitoring entity.

A further advantage consists in that it is impossible for the control unit to wrongly inform the second external monitoring entity that the monitoring entity executing the safety monitoring of the control unit operates faultlessly even though it does not. The reliability of the information content of the information received by the second external monitoring entity is considerably increased. The functional reliability of the function monitoring of the first monitoring entity which monitors the control unit with regard to the maintenance of predefined safety requirement levels is increased significantly.

The fact that the information cannot be interpreted by the control unit advantageously prevents a correct monitoring result being misrepresented when the control unit is in communication with other external control units. At the same time, it is prevented that the control unit wrongly misrepresents a correct monitoring result by misprogramming and sends it to the second monitoring entity.

The risk that the second external monitoring entity receives wrong information about the activity or non-activity of the first monitoring entity is significantly reduced. The risk that a failure of the safety monitoring system of the control unit is not detected by the first monitoring entity is significantly reduced. As a result, the risk that the safety-related control unit has malfunctions is lowered at the same time.

If, for example, the control unit is a control unit for controlling and checking an electrical vacuum pump of a motor vehicle, it would be a safety-related system, the reliability of which could be increased significantly by the method described.

In this context, a system is "safety-related" if, as a rule, a malfunction in the system can lead to a direct hazard to life and limb of road users. The driving situation cannot be controlled or influenced by the vehicle passengers. Conforming to the ISO WD 26262 Standard, the "reliability" of a system is the capability of the system to perform a service reliably. This applies, e.g., under the condition that the system has been started correctly and no faults and/or failures occur either during the beginning or during the process. The method described thus guarantees a minimization of risk with regard to the probability of an occurrence of a fault and/or of a failure of a safety-related system.

According to an embodiment of the invention, the second monitoring entity initiates at least one safety measure for compensating for the malfunction of the first monitoring entity and/or the malfunction of the control unit in the case where the function monitoring shows that the information item, received by the second monitoring entity, about the safety monitoring deviates from predefined nominal transmission signals with regard to content and/or time intervals, wherein a deviation of the information item, received by the second monitoring entity, about the safety monitoring from the predefined nominal transmission signals with regard to content and/or time intervals comprises:

a malfunction of the first monitoring entity and/or a malfunction of the control unit.

This may have the advantage that, for example in the case of a malfunction or in the case of a total failure of the first monitoring entity, the second monitoring entity takes over the function of the safety monitoring system of the control unit and thus acts as a backup system for the first monitoring entity. Due to the fact that the second monitoring entity monitors the first monitoring entity continuously with regard to its functionality, the risk that a faulty operation of a safety-related system is not detected is considerably reduced.

If, for example, the control unit itself were to disable the first monitoring entity, for example via a reset line, due to misprogramming or due to a fault of a different type, the second monitoring entity would register this and initiate at least one suitable safety measure for compensating for the malfunction of the control unit and/or the malfunction of the first monitoring entity. If, for example, the safety-related system were an electrical vacuum pump which has a malfunction or a total failure during the operation, the second monitoring entity could initiate an hydraulic braking force amplification, for example, for compensating for the failed braking force amplification.

Due to the fact that the second monitoring entity performs a continuous calibration between the signals received from the first monitoring entity and predefined nominal transmission signals with regard to content and/or time intervals, high reliability with regard to the function monitoring of the first monitoring entity is guaranteed.

According to one embodiment of the invention, the second monitoring entity initiates at least one safety measure for compensating for the malfunction of the first monitoring entity and/or the malfunction of the control unit in the case where the function monitoring shows that the information item, received by the second monitoring entity, about the safety monitoring deviates from predefined nominal transmission signals with regard to content and/or time intervals, wherein a deviation of the information item, received by the second monitoring entity, about the safety monitoring from the predefined nominal transmission signals with regard to content and/or time intervals comprises:

a transmission error of the information item and/or an error in the information.

This may have the advantage that, for example, the second monitoring entity initiates safety measures also with a lack of information which can be due, for example, to an error at an interface between a control unit and the second monitoring entity or due to a total failure of the first monitoring entity.

Due to the fact that the second monitoring entity performs a continuous calibration between the received signals and predefined nominal transmission signals, it is possible to detect not only transmission errors but also errors in the information itself are detected. If the signals received by the second monitoring entity deviate from the predefined nominal transmission signals with regard to content and/or time intervals, the second monitoring entity initiates, as a precaution, safety measures such as, e.g., delivery of a warning signal and/or activation of the hydraulic braking system. Safety requirements to be adhered to as are required by the ISO Standard 26262 with regard to the ASIO C-class can be ensured with high reliability by the method described.

According to one embodiment of the invention, the second monitoring entity generates a warning message in the case where the function monitoring shows that the information item, received by the second monitoring entity, about the safety monitoring deviates from predefined nominal transmission signals with regard to the content and/or the time intervals.

This may have the advantage that, for example, the driver of the vehicle is informed, for example by activation of a warning lamp during driving, that, for example, the braking force amplification is restricted, as a result of which the driver is provided with the possibility of carrying out compensatory measures for compensating for the failed braking force amplification himself and adapting his manner of driving accordingly.

According to one embodiment of the invention, a method for safety monitoring of a control unit of an actuator system of a motor vehicle is created, wherein safety monitoring of the control unit is carried out by a first monitoring entity, wherein the control unit and the first monitoring entity form a system, and wherein the first monitoring entity sends a result of the safety monitoring as an information item to a second monitoring entity, which can be coupled to the system, at temporarily defined time intervals, wherein the first monitoring entity and the second monitoring entity are free of a common interface, wherein an interface serves as the interface of the system of the second monitoring entity, wherein the system transmits the information item from the control unit to the second monitoring entity by utilizing the interface, wherein the first monitoring entity codes the information in a format which cannot be interpreted by the control unit.

This may have the advantage that the control unit of a safety-related system and a first monitoring entity which carries out continuous safety monitoring of the control unit can be integrated in a single system unit. Due to the fact that the first monitoring entity provides non-interpretable signals as a result of the safety monitoring for the control unit, a single interface, namely the already present interface of the control unit, can be used for further transmission of these signals. The first monitoring entity can thus be designed to have a small volume and to be cost-effective. An extra inerface, for example an additional CAN bus, for transmitting the information item sent from the first monitoring entity with regard to a result of the continuous safety monitoring of the control unit can thus be omitted. A control unit of a safety-related system can thus be designed as a single module with an integrated first monitoring entity.

In a further aspect, the invention relates to a computer program product comprising processor-executable instructions for carrying out the method described above.

In a further aspect, the invention relates to a system comprising a control unit for an actuator system of a motor vehicle and a first monitoring entity, wherein the first monitoring entity is designed for performing safety monitoring of the control unit, wherein the first monitoring entity is also designed for sending a result of the safety monitoring as an information item to a second monitoring entity, which can be coupled to the system, at temporarily defined time intervals, wherein the first monitoring entity and the second monitoring entity are free of a common interface, wherein the control unit has an interface for the second monitoring entity, wherein the system is designed for transmitting the information item from the control unit to the second monitoring entity by utilizing the interface, wherein the information item is coded in a format which cannot be interpreted by the control unit.

In a further aspect, the invention relates to a system for monitoring the function of a safety monitoring system of a control unit of an actuator system of a motor vehicle, wherein the system has a first monitoring entity, a second monitoring entity and a control unit, wherein the function monitoring is designed for performing a check as to whether the safety monitoring is performed faultlessly, wherein the first monitoring entity is designed for performing the safety monitoring and the second monitoring entity is designed for performing the function monitoring, wherein the first monitoring entity is designed for sending a result of the safety monitoring as an information item to the second monitoring entity at temporarily defined time intervals, wherein the first monitoring entity and the second monitoring entity are free of a common interface, wherein the second monitoring entity is designed for receiving the information item by utilizing an interface between the second monitoring entity and the control unit, wherein the information is coded in a format which cannot be interpreted by the control unit.

BRIEF DESCRIPTION OF THE DRAWINGS

The invention is best understood from the following detailed description when read in connection with the accompanying drawings. Included in the drawings is the following figures:

FIG. 1 shows a block diagram of the system consisting of a control unit, a first monitoring entity and a second monitoring entity.

DETAILED DESCRIPTION OF THE PREFERRED EMBODIMENTS

FIG. 1 shows a block diagram of a system 120 comprising a control unit 100 of a safety-related system, for example an electrical vacuum pump. The system 120 also comprises a first monitoring entity 102 and a second monitoring entity 104. The control unit 100 is monitored continuously by a first monitoring entity 102 with regard to the maintenance of predefined safety requirements by means of a safety monitoring system 116. As a result of this safety monitoring 116, the first monitoring entity 102 provides an information item 110 which can be sent to a coupleable second monitoring entity 104 in a format, which cannot be interpreted by the control unit 100, when passing the control unit 100 and by utilizing an interface 108 of the control unit. The second monitoring entity 104 performs continuous function monitoring 118 of the first monitoring entity 102 by continuous evaluation of the received information item 110.

The information item 110 is sent by the first monitoring entity 102 in coded form, which can contain predefined symbols, letters, numbers and/or a timing signal, to the second monitoring entity 104 via the control unit 100. The second monitoring entity 104 compares the received information with respect to content and pulse timing with predefined nominal transmission signals. In the case of a deviation of the received signals from the predefined nominal values, the second monitoring entity 104 immediately initiates suitable safety measures.

Embodiments of the invention can have any suitable form of coding:
a) the first monitoring entity could send, for example, a constant value, for example $A5, to the second monitoring entity with a positive result. The second monitoring entity 104 then checks the received information 110 for the correct code $A5. If the second monitoring entity 104 were to receive a value deviating from this as information item 110, the second monitoring unit 104 is informed that an error has occurred in operation of the first monitoring entity 106 and/or in operation of the control unit 100.
b) A further exemplary possible coding could have a periodically changing sequence of symbols, letters and/or numbers, for example $A1→A3→$A7→$AF→$A1. The second monitoring entity 104 then checks the received information 110 against a predefined nominal code sequence of this kind.
c) A further possible form of coding could comprise a ZR_code, for example $A5, and a periodically changing time sequence, for example an alive counter $00-$03. This code could be linked mathematically to the alive counter with a packaging rule, for example by a multiplication or by a Boolean operation, for example XOR. If the first monitoring entity 102 were to send the alive counter and a calculated code to the second monitoring entity 104 when passing the control unit, the second monitoring entity 104 would decode this calculated code by means of a predefined unpackaging rule, evaluate the alive counter and check the received ZR_Code for correctness.

In all embodiments of the coding it is essential that the second monitoring entity is designed for calculating the forward calculation performed by the first monitoring entity 102 back again.

If the second monitoring entity 104 finds a deviation from the predefined nominal transmission signals during the continuous calibration of the received information item 108, the second monitoring entity 104 immediately initiates suitable safety measures. Causative error sources for a deviation between received signals and the predefined nominal signals can be considered to be:
a failure and/or a faulty operation of the control unit 100,
a failure and/or a faulty operation of the first monitoring entity 102,
a fault during the transmission of the information 108, for example caused by a defect at the interface 108, also comprising a failure of the information reception and/or
a fault in the information 108, caused, for example, by misprogramming or unwanted manipulation.

In every case of a deviation of received signals and predefined nominal signals, the second monitoring entity 104 initiates measures in order to compensate for a malfunction of the first monitoring entity 102 and/or a malfunction of the control unit 100. In the case where the first monitoring entity 102 has failed or exhibits a faulty operation, the second monitoring entity 104 initiates safety functions and safety measures, respectively. Thus, the second monitoring entity 104 could deliver, for example, a warning message and/or, for example, activate an hydraulic braking system. In the case of a failure and/or faulty operation of the control unit 100, the second monitoring entity 104 initiates a measure in order to replace the effect of the actuator system of the motor vehicle, controlled by the control unit 100, by an initiation of another actuator system having the same effect. Should the control unit 100 control, for example, an electrical vacuum pump and the second monitoring entity 104 find a deviation of the received signals from the predefined nominal transmission signals, the second monitoring entity 104 would turn off the electrical vacuum pump and instead activate the hydraulic brake amplification system.

In order to ensure that the function monitoring 118 of the first monitoring entity 102 is performed promptly by the second monitoring entity 104, the information 110 sent by the first monitoring entity 102 can contain a timing signal 114. In order to prevent the control unit 100 from "learning" the code of the information, this code can be altered continuously at the first monitoring entity 102 in a further embodiment of the invention. As a result, the degree of reliability of the function monitoring 118 of the first monitoring entity 102 is significantly increased with regard to its safety monitoring 116 of the control unit 100. The safety precautions required by the ISO Standard 26262 at the system, hardware and software level in safety-related systems in motor vehicles can thus be met to a high degree by the method described.

LIST OF REFERENCE SYMBOLS

100 Control unit
102 First monitoring entity
104 Second monitoring entity
106 System comprising control unit and first monitoring entity
108 Interface of the control unit
110 Information item
112 Content of the information
114 Timing signal of the information
116 Safety monitoring
118 Function monitoring
120 System for monitoring the function of a safety monitoring system

The invention claimed is:

1. A computer-implemented method for monitoring the function of a safety monitoring system of a control unit of an actuator system of a motor vehicle, wherein it is checked by the function monitoring whether the safety monitoring is performed faultlessly, wherein the safety monitoring is carried out by a first monitoring entity and the function monitoring is carried out by a second monitoring entity, wherein the first monitoring entity sends a result of the safety monitoring as an information item to the second monitoring entity at defined time intervals, wherein the first monitoring entity and the second monitoring entity are free of a common interface, wherein the information item is received by the second monitoring entity by utilizing an interface between the second monitoring entity and the control unit, and wherein the information item is coded in a format which cannot be interpreted by the control unit.

2. The method as claimed in claim 1, wherein the second monitoring entity initiates at least one safety measure for compensating for a malfunction of the first monitoring entity and/or a malfunction of the control unit in the case where the function monitoring shows that the information item, received by the second monitoring entity, about the safety monitoring deviates from predefined nominal transmission signals with regard to content and/or time intervals, wherein a deviation of the information item, received by the second monitoring entity, about the safety monitoring from the predefined nominal transmission signals with regard to content and/or time intervals comprises:
a malfunction of the first monitoring entity and/or
a malfunction of the control unit.

3. The method as claimed in claim 1, wherein the second monitoring entity initiates at least one safety measure for compensating for a malfunction of the first monitoring entity and/or a malfunction of the control unit in the case where the function monitoring shows that the information item, received by the second monitoring entity, about the safety monitoring deviates from predefined nominal transmission signals with regard to content and/or time intervals, wherein a deviation of the information item, received by the second monitoring entity, about the safety monitoring from the predefined nominal transmission signals with regard to content and/or time intervals comprises:
a transmission error of the information item and/or
an error in the information.

4. The method as claimed in claim 3, wherein the second monitoring entity generates a warning message in the case where the function monitoring shows that the information item, received by the second monitoring entity, about the safety monitoring deviates from predefined nominal transmission signals with regard to the content and/or the time intervals.

5. The method as claimed in claim 2, wherein the second monitoring entity generates a warning message in the case where the function monitoring shows that the information item, received by the second monitoring entity, about the safety monitoring deviates from predefined nominal transmission signals with regard to the content and/or the time intervals.

6. A non-transitory computer program product comprising processor-executable instructions for performing the method steps as claimed in claim 1.

7. A method for safety monitoring of a control unit of an actuator system of a motor vehicle, wherein safety monitoring of the control unit is carried out by a first monitoring entity, wherein the control unit and the first monitoring entity form a system,
wherein the first monitoring entity sends a result of the safety monitoring as an information item to a second monitoring entity, which can be coupled to the system, at temporarily defined time intervals, wherein the first monitoring entity and the second monitoring entity are free of a common interface, wherein an interface serves as the interface of the system for the second monitoring entity, wherein the system transmits the information item from the control unit to the second monitoring entity by utilizing the interface, and wherein the first monitoring entity codes the information in a format which cannot be interpreted by the control unit.

8. A computer program product comprising processor-executable instructions for performing the method steps as claimed in claim 7.

9. A system comprising a control unit for an actuator system of a motor vehicle and a first monitoring entity, wherein the first monitoring entity is designed for performing safety monitoring of the control unit, wherein the first monitoring entity is also designed for sending a result of the safety monitoring as an information item to a second monitoring entity, which can be coupled to the system, at temporarily defined time intervals, wherein the first monitoring entity and the second monitoring entity are free of a common interface, wherein the control unit has an interface for the second monitoring entity, wherein the system is designed for transmitting the information item from the control unit to the second monitoring entity by utilizing the interface, and wherein the information item is coded in a format which cannot be interpreted by the control unit.

10. A system for monitoring the function of a safety monitoring system of a control unit of an actuator system of a motor vehicle, wherein the system has a first monitoring entity, a second monitoring entity and the control unit, wherein the function monitoring is designed for performing a check as to whether the safety monitoring is performed faultlessly, wherein the first monitoring entity is designed for performing the safety monitoring and the second monitoring entity is designed for performing the function monitoring, wherein the first monitoring entity is designed for sending a result of the safety monitoring as an information item to the second monitoring entity at temporarily defined time intervals, wherein the first monitoring entity and the second monitoring entity are free of a common interface, wherein the second monitoring entity is designed for receiving the information item by utilizing an interface between the second monitoring entity and the control unit, and wherein the information item is coded in a format which cannot be interpreted by the control unit.

* * * * *